United States Patent
Mazurenko et al.

(10) Patent No.: US 8,780,983 B2
(45) Date of Patent: Jul. 15, 2014

(54) INTRA-MODE PREDICTION FOR A VIDEO TRANSCODER

(75) Inventors: Ivan Leonidovich Mazurenko, Khimki (RU); Aleksey Alexandrovich Letunovskiy, Tokarevka (RU); Alexander Markovic, Media, PA (US); Denis Vassilevich Parfenov, Moscow (RU); Alexander Alexandrovich Petyushko, Bryansk (RU)

(73) Assignee: LSI Corporation, San Jose, CA (US)

( * ) Notice: Subject to any disclaimer, the term of this patent is extended or adjusted under 35 U.S.C. 154(b) by 385 days.

(21) Appl. No.: 13/163,853

(22) Filed: Jun. 20, 2011

(65) Prior Publication Data

US 2012/0082220 A1   Apr. 5, 2012

(30) Foreign Application Priority Data

Oct. 1, 2010 (RU) ............................... 2010140334

(51) Int. Cl.
*H04N 7/32* (2006.01)
*H04N 7/26* (2006.01)
*H04N 7/46* (2006.01)

(52) U.S. Cl.
CPC ... *H04N 19/00218* (2013.01); *H04N 19/00472* (2013.01); *H04N 19/00278* (2013.01); *H04N 19/00757* (2013.01); *H04N 19/00042* (2013.01)
USPC .................................................. 375/240.12

(58) Field of Classification Search
None
See application file for complete search history.

(56) References Cited

U.S. PATENT DOCUMENTS

2006/0133500 A1   6/2006 Lee et al.

OTHER PUBLICATIONS

Jian, Zhang et al., "A Fast Algorithm for Intra Downsizing in H.264/AVC Transcoding," ISECS International Colloquium on Computing, Communication, Control, and Management, 2008, pp. 496-499.
Sairam, Y. N. et al., "A Novel Partial Prediction Algorithm for Fast 4×4 Intra Prediction Mode Decision in H.264/AVC," DCC '08 Proceedings of the Data Compression Conference, pp. 232-241, 2008.
Storey, Duane et al., "An Efficient Statistical Intra-mode Prediction Method for H.264," IEEE International Symposium on Signal Processing and Information Technology, 2006, pp. 803-806.
Shen, Huifeng et al., "A Fast Downsizing Video Transcoder for H.264/avc With Rate-distortion Optimal Mode Decision," IEEE Transactions on Circuits and Systems for Video Technology, pp. 746-755, Jul. 2006.

*Primary Examiner* — Sath V Perungavoor
*Assistant Examiner* — Kate Luo
(74) *Attorney, Agent, or Firm* — Mendelsohn, Drucker & Dunleavy, P.C.; Yuri Gruzdkov; Steve Mendelsohn

(57) ABSTRACT

A video transcoder for converting an encoded input video bit-stream having one spatial resolution into an encoded output video bit-stream having a lower spatial resolution, wherein learned statistics of intra-mode transcoding are used to constrain the search of intra modes for the output video bit-stream. The statistics of intra-mode transcoding can be gathered, e.g., by applying brute-force downsizing to a training set of video frames and then analyzing the observed intra-mode transcoding patterns to determine a transition-probability matrix for use during normal operation of the transcoder. The transition-probability matrix enables the transcoder to select appropriate intra modes for the output video bit-stream without performing a corresponding exhaustive full search, which advantageously reduces the computational complexity and processor load compared to those of a comparably performing prior-art video transcoder.

21 Claims, 4 Drawing Sheets

FIG. 1A
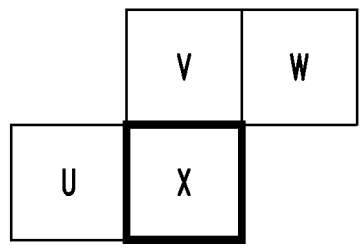
FIG. 1B
FIG. 1C
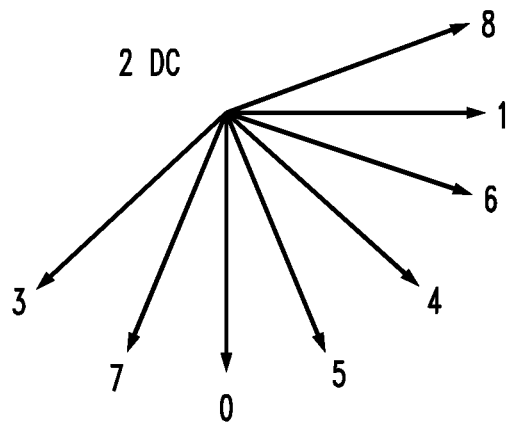

$P = [P_{nm}]$    $N=3$

| n\m | 0 | 1 | 2 | 3 | 4 | 5 | 6 | 7 | 8 |
|---|---|---|---|---|---|---|---|---|---|
| 0 | 0.34 | 0.24 | 0.15 | 0.02 | 0.10 | 0.05 | 0.03 | 0.03 | 0.04 |
| 1 | 0.16 | 0.32 | 0.14 | 0.02 | 0.10 | 0.03 | 0.10 | 0.02 | 0.11 |
| 2 | 0.24 | 0.18 | 0.29 | 0.03 | 0.10 | 0.02 | 0.04 | 0.01 | 0.09 |
| 3 | 0.21 | 0.18 | 0.16 | 0.10 | 0.06 | 0.04 | 0.03 | 0.06 | 0.16 |
| 4 | 0.07 | 0.09 | 0.09 | 0.01 | 0.53 | 0.07 | 0.11 | 0.01 | 0.02 |
| 5 | 0.14 | 0.10 | 0.10 | 0.02 | 0.29 | 0.22 | 0.06 | 0.02 | 0.05 |
| 6 | 0.13 | 0.18 | 0.08 | 0.01 | 0.23 | 0.04 | 0.27 | 0.01 | 0.05 |
| 7 | 0.28 | 0.18 | 0.12 | 0.08 | 0.08 | 0.04 | 0.02 | 0.11 | 0.09 |
| 8 | 0.11 | 0.22 | 0.14 | 0.04 | 0.03 | 0.02 | 0.03 | 0.01 | 0.40 |

400

INTRA-MODE PREDICTION FOR A VIDEO TRANSCODER

BACKGROUND

1. Field of the Invention

The present invention relates to video transcoding and, more specifically but not exclusively, to changing spatial resolution in encoded video bit-streams.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Video transcoding is a process of converting a previously encoded video bit-stream into another encoded video bit-stream, e.g., with a different bit rate, a different frame rate, a different display format, and/or a different coding method. For example, video transcoding can be used to convert a video bit-stream encoded in one standard into a video bit-stream encoded in a different standard, with the initial and final standards selected from a set consisting of the H.26x and MPEG-z families of standards, where x=1, 3, 4 and z=1, 2, 4. Another important example of video transcoding is conversion of an encoded video bit-stream having one spatial resolution into an encoded video bit-stream having a different (typically lower) spatial resolution, without changing the standard. Other video-transcoding operations may include adding enhanced error resilience, inserting logos and watermarks, adjusting temporal resolution, etc. Video transcoding advantageously enables multimedia devices of diverse formats and capabilities to exchange video content on heterogeneous transport-network platforms, such as the Internet.

The H.26x and MPEG-z families of standards employ intra-mode prediction to compress video data based on spatial redundancy present in a given frame or picture. To achieve high coding efficiency, a video encoder typically performs an exhaustive full search, during which the encoder calculates the sum of absolute differences (SAD) for each intra mode and chooses a mode corresponding to the minimum SAD value as the best mode for a macroblock (MB). This procedure makes the intra-mode-prediction algorithmic module one of the dominant components of a video transcoder in terms of computational complexity and processor load. It is therefore desirable to have an intra-mode-prediction algorithm that can produce acceptable video quality while keeping the corresponding computational complexity and/or processor load at relatively low levels.

SUMMARY

Disclosed herein are various embodiments of a video transcoder for converting an encoded input video bit-stream having one spatial resolution into an encoded output video bit-stream having a lower spatial resolution, wherein learned statistics of intra-mode transcoding are used to constrain the search of intra modes for the output video bit-stream. The statistics of intra-mode transcoding can be gathered, e.g., by applying brute-force downsizing to a training set of video frames and then analyzing the observed intra-mode transcoding patterns to determine a transition-probability matrix for use during normal operation of the transcoder. The transition-probability matrix enables the transcoder to select appropriate intra modes for the output video bit-stream without performing a corresponding exhaustive full search, which advantageously reduces the computational complexity and processor load compared to those of a comparably performing prior-art video transcoder.

According to one embodiment, provided is a method of resizing digital video having the steps of converting a group of first macroblocks in a first video frame having a first spatial resolution into a second macroblock in a corresponding second video frame having a second spatial resolution smaller than the first spatial resolution; ranking intra modes in an output basis set of intra modes based on intra modes used in the group of first macroblocks and on intra-mode transcoding statistics; identifying a set of one or more candidate intra modes for the second macroblock based on the ranking, wherein the identified set is smaller than the output basis set; selecting an intra mode for intra-mode-prediction coding of the second macroblock from the identified set; and applying the intra-mode-prediction coding to the second macroblock using the output basis set.

According to another embodiment, provided is a video transcoder having a decoder adapted to decode an encoded video bit-stream to produce a first video frame having a first spatial resolution and a downsizer adapted to convert the first video frame into a corresponding second video frame having a second spatial resolution smaller than the first spatial resolution, wherein a group of first macroblocks from the first video frame is converted into a second macroblock in the second video frame. The video transcoder further has an encoder adapted to apply intra-mode-prediction coding to the second macroblock using an output basis set of intra modes. The intra modes in the output basis set are ranked based on intra-mode transcoding statistics and intra modes used in the group of first macroblocks. A set of one or more candidate intra modes for the second macroblock is identified based on the ranking, wherein the identified set is smaller than the output basis set. An intra mode for the intra-mode-prediction coding of the second macroblock is selected from the identified set.

According to yet another embodiment, provided is a video transcoder having: means for converting a group of first macroblocks in a first video frame having a first spatial resolution into a second macroblock in a corresponding second video frame having a second spatial resolution smaller than the first spatial resolution; means for ranking intra modes in an output basis set of intra modes based on intra modes used in the group of first macroblocks and on intra-mode transcoding statistics; means for identifying a set of one or more candidate intra modes for the second macroblock based on the ranking, wherein the identified set is smaller than the output basis set; means for selecting an intra mode for intra-mode-prediction coding of the second macroblock from the identified set; and means for applying the intra-mode-prediction coding to the second macroblock using the output basis set.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 1A-1C illustrate intra modes that can be used in a video encoder for intra-mode prediction of a 4×4 macroblock according to one embodiment of the invention;

DETAILED DESCRIPTION

FIGS. 1A-1C illustrate intra modes that can be used in a video encoder for intra-mode prediction of a 4×4 macroblock X according to one embodiment of the invention. More specifically, FIG. 1A shows the positions of macroblocks U, V, and W with respect to macroblock X, with macroblocks U, V, and W being the macroblocks that contain the pixels that can be used for intra-mode prediction of macroblock X. FIG. 1B shows (1) the sixteen pixels of macroblock X; (2) twelve relevant pixels of macroblocks U, V, and W, where pixels I,J,K,L ⊂ U, pixels A,B,C,D ⊂ V, and pixels E,F,G,H ⊂ W; and (3) the corner pixel M, where pixels A-M are the pixels that can be used in the intra-mode prediction of macroblock X. FIG. 1C shows directions corresponding to different intra modes of a basis set that can be used in the intra-mode prediction of macroblock X according to one embodiment of the invention.

Intra-mode prediction exploits spatial correlation between adjacent macroblocks of the same frame and is typically used for coding I-frames. Different intra modes selected for intra-mode-prediction coding typically correspond to different edge orientations for objects within the picture, with the direction of the intra mode selected for a particular macroblock usually being the closest one to the orientation of an edge within that macroblock.

Referring now to FIGS. 1B-1C, mode 0 is the vertical prediction mode in which (i) pixels a, e, i, and m of macroblock X are predicted based on pixel A; (ii) pixels b, f, j, and n of macroblock X are predicted based on pixel B, and so on.

Mode 1 is the horizontal prediction mode in which (i) pixels a, b, c, and d of macroblock X are predicted based on pixel I; (ii) pixels e, f, g, and h of macroblock X are predicted based on pixel J, and so on.

Mode 2 is the DC-prediction mode in which all pixels (a to p) of macroblock X are predicted by averaging the values of pixels A-D and I-L, e.g., as follows (A+B+C+D+I+J+K+L)/8.

For modes 3-8, the values for pixels a-p are predicted using a weighted average of pixels A-M. For example, for mode 3, the value for pixel a is predicted as A/4+B/2+C/4; the value for pixels b and e is predicted as B/4+C/2+D/4; the value for pixels c, f, and i is predicted as C/4+D/2+E/4; and so on. The weighted-average formulae for other modes can be found, e.g., in Draft ITU-T Recommendation and Final Draft International Standard of Joint Video Specification (ITU-T Rec. H.264 | ISO/IEC 14496-10 AVC), which is incorporated herein by reference in its entirety.

Figure 2:
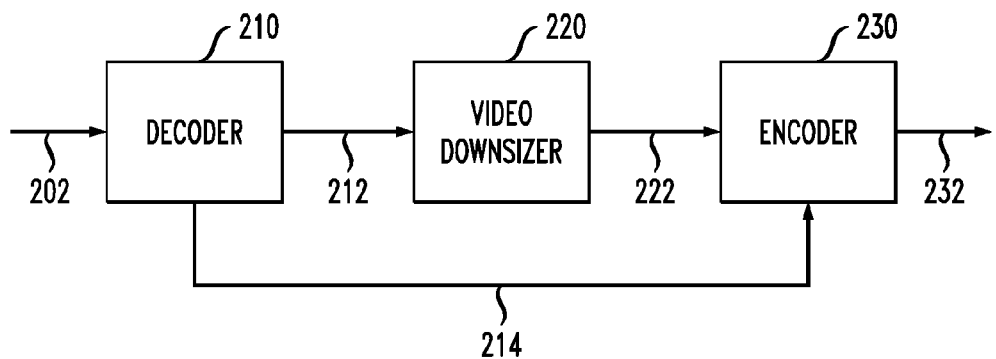
FIG. 2 shows a block diagram of a video transcoder according to one embodiment of the invention.

FIG. 2 shows a block diagram of a video transcoder 200 according to one embodiment of the invention. Video transcoder 200 has a decoder 210, a video downsizer 220, and an encoder 230. An input video bit-stream 202 having a first (original) spatial resolution is applied to decoder 210. Decoder 210 decodes (partially or fully) input video bit-stream 202, e.g., as known in the art, to produce a decoded video bit-stream 212. Video downsizer 220 then processes bit-stream 212 to perform planar image-size transformation from the original size/resolution (e.g., Y1 by Y2 pixels) to a new second (target) size/resolution (e.g., Z1 by Z2 pixels), where Z1=k Y1, Z2=k Y2, and k is a scaling factor (SF). Typically, the scaling factor is between zero and one (0<k<1) and can be represented as a simple fraction, k=η/N, where η and N are positive integers. In one embodiment, η=1.

A transformed video bit-stream 222 generated by video downsizer 220 is applied to encoder 230. Encoder 230 encodes video bit-stream 222 to generate an output video bit-stream 232 having the target spatial resolution. In the encoding process, encoder 230 uses information about the original-resolution intra modes provided to it via a feed-forward signal 214 by decoder 210 as further described below in reference to FIGS. 3-4. This information enables encoder 230 to select appropriate intra modes at the target resolution for video bit-stream 232 without performing a corresponding exhaustive full search, which advantageously reduces the computational complexity and processor load for video transcoder 200 compared to those of a comparably performing prior-art video transcoder.

Additional information on the possible architecture and various embodiments of video transcoder 200 can be found, e.g., in commonly owned Russian Patent Application No. 2010135495, filed on Aug. 24, 2010, and entitled "VIDEO TRANSCODER WITH FLEXIBLE QUALITY AND COMPLEXITY MANAGEMENT," which is incorporated herein by reference in its entirety. Certain methods of the present invention can be implemented, e.g., in intra-mode estimator 248 shown in FIG. 2A of that patent application.

Figure 3A:
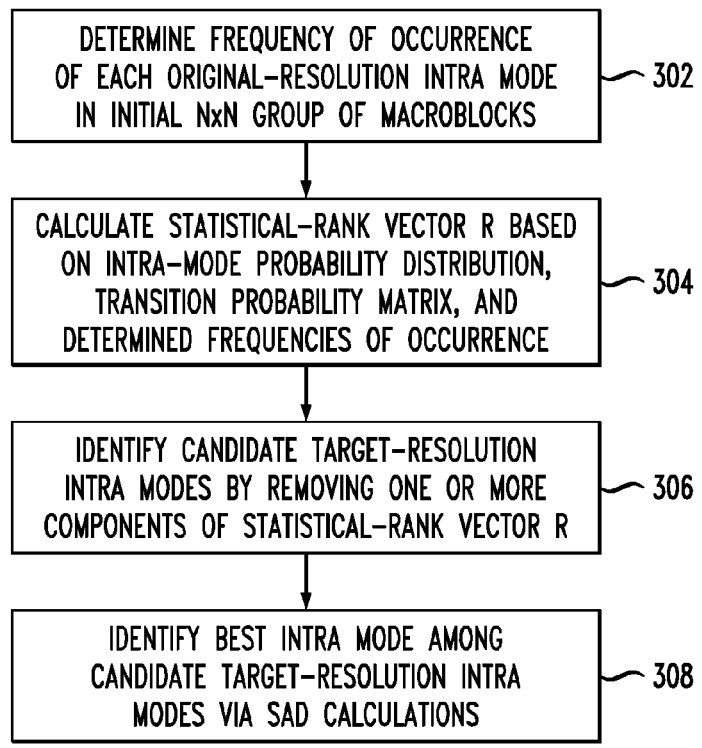
FIGS. 3A-3C illustrate a video-encoding method that can be used in the video transcoder of FIG. 2 according to one embodiment of the invention.
Figures 3B, 3C:
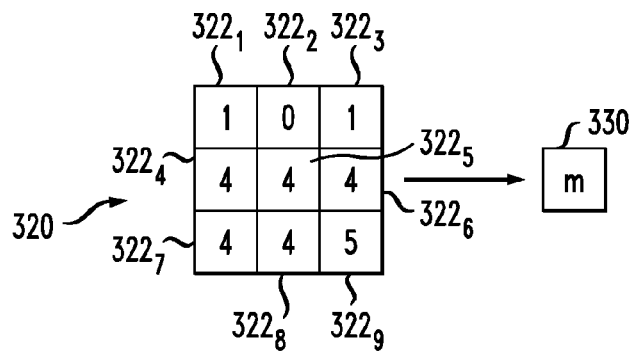

FIGS. 3A-3C illustrate a video-encoding method 300 that can be used in encoder 230 (FIG. 2) according to one embodiment of the invention. More specifically, FIG. 3A shows a flowchart of method 300. FIG. 3B illustrates an exemplary intra-mode configuration that can be transcoded using method 300. FIG. 3C shows an exemplary transition-probability matrix $P=[P_{nm}]$ that can be used in method 300, where n and m are the indices corresponding to the original-resolution intra modes and target-resolution intra modes, respectively. Note that the transition-probability matrix shown in FIG. 3C corresponds to a transcoding configuration in which the same basis set having the nine intra modes shown in FIG. 1C is used both at the original resolution and at the target resolution. For illustration purposes, method 300 is described below for this transcoding configuration and a scaling factor k=1/N. The scaling factor of 1/N corresponds to a downsizing transformation in which an N×N group of macroblocks from an original-resolution frame is converted into one macroblock of a corresponding target-resolution frame. One skilled in the art will appreciate that method 300 can be modified in a relatively straightforward manner for use with other transcoding configurations and/or other scaling-factor values.

At step 302 of method 300, the frequency of occurrence of each intra mode in an N×N group of original-resolution macroblocks is determined. For example, to determine frequency $f_0$ of occurrence of intra mode 0, the number of macroblocks in the N×N group that use intra mode 0 is counted. To determine frequency $f_1$ of occurrence of intra mode 1, the number of macroblocks in the N×N group that use intra mode 1 is counted. To determine frequency $f_2$ of occurrence of intra mode 2, the number of macroblocks in the N×N group that use intra mode 2 is counted, and so on until all nine components of frequency vector $F=(f_0, f_1, f_2, f_3, f_4, f_5, f_6, f_7, f_8)$ are determined. Since the total number of macroblocks in the N×N group is $N^2$, frequency vector F satisfies Eq. (1):

$$\frac{1}{N^2} \sum_{n=0}^{8} f_n = 1 \qquad (1)$$

Note that some components of frequency vector F can be zero.

As an example, FIG. 3B shows a 3×3 group 320 (i.e., N=3) of macroblocks $322_1$-$322_9$ that is being downsized to generate a single macroblock 330. The number shown inside each of macroblocks $322_1$-$322_9$ indicates the intra mode corresponding to that macroblock. The 3×3 matrix formed by these numbers represents the intra-mode configuration of group 320. The nine-component frequency vector F calculated at step 302 for group 320 is given by the following string: (1,2,0,0,5,1,0,0,0). It is easy to verify that this string satisfies Eq. (1). The number m shown inside macroblock 330 indicates the target-resolution intra mode corresponding to that macroblock.

At step 304, for each target-resolution intra mode, the mode's statistical rank $r_m$ is calculated. Statistical rank $r_m$ is a measure of the likelihood that intra mode m is the best intra mode for the target-resolution macroblock corresponding to the given intra-mode configuration of the initial N×N group of macroblocks. Statistical ranks $r_m$ corresponding to different intra modes of the basis set form a statistical-rank vector $R=(r_0, r_1, r_2, r_3, r_4, r_5, r_6, r_7, r_8)$.

In one embodiment, statistical rank $r_m$ is calculated using Eq. (2):

$$r_m = \frac{\sum_{n=0}^{8} f_n \rho_n P_{nm}}{\sum_{n=0}^{8} f_n \rho_n} \quad (2)$$

where $f_n$ is an n-th component of frequency vector F calculated at step 302; $\rho_n$ is the a priori statistical weight of intra mode n in the probability distribution of intra modes; $P_{nm}$ is a corresponding matrix element of transition-probability matrix P (see, e.g., FIG. 3C); and m=0, 1, . . . , 8. Statistical weights $\rho_n$ satisfy Eq. (3):

$$\sum_{n=0}^{8} \rho_n = 1 \quad (3)$$

The physical meaning of statistical weights $\rho_n$ can be understood, for example, as follows. If a bit-stream of video frames is considered to be a stochastic process at the macroblock level (which is a reasonable approximation), then the overall probability of occurrence for each individual intra mode can be determined by observing a sufficiently long stream (e.g., several hours worth) of video frames. An individual statistical weight $\rho_i$ then represents the overall probability of occurrence of intra mode i in that stream. The full set of statistical weights A, where i=0, 1, . . . , 8, then represents the overall probability-distribution function for the intra modes of the basis set in the original-resolution video. It is assumed that this probability-distribution function is an intrinsic characteristic of the video content that is being handled by the transcoder. This means that one should arrive at substantially the same probability-distribution function regardless of the particular training video set used for the determination of the full set of $\rho_i$.

Eq. (3) reflects the fact that the probability distribution is normalized to one. In general, different intra modes of the basis set are not equally probable, and some intra modes occur more frequently than other intra modes. However, as a simplification, an assumption that all intra modes of the basis set are equally probable can be used in one possible implementation of step 304. In the latter case, the probability distribution need not be measured, and Eq. (2) is reduced to Eq. (4) by using in the former (i) $\rho_n = 1/9$ and (ii) the normalization of vector F given by Eq. (1):

$$r_m = \frac{\sum_{n=0}^{8} f_n P_{nm}}{N^2} \quad (4)$$

Matrix element $P_{nm}$ of transition-probability matrix P represents conditional probability for target-resolution intra-mode m to be the best intra mode for the downsized macroblock (e.g., macroblock 330, FIG. 3B) if the initial N×N group of macroblocks (e.g., group 320, FIG. 3B) has one intra mode n. As used herein, the term "best intra mode" refers to an intra mode that produces the smallest sum of absolute differences (SAD) for the target-resolution macroblock. Each row of transition-probability matrix P satisfies Eq. (5):

$$\sum_{m=0}^{8} P_{nm} = 1 \quad (5)$$

It is assumed that conditional probability $P_{nm}$ does not depend on the specific position of the macroblock having intra mode n in the initial N×N group of macroblocks. A theoretical analysis and numerical simulations were used to substantiate the reasonableness of this assumption.

The particular transition-probability matrix P shown in FIG. 3C corresponds to N=3. One skilled in the art will appreciate that a conceptually similar transition-probability matrix can be used for other N values and/or other scaling factors k. A representative method that can be used to generate transition-probability matrix P is described below in reference to FIG. 4. As will be apparent from the corresponding description, this method lends itself to fairly straightforward generalization for use with any N value, any scaling factor k<1, and even with different intra-mode basis sets used at the input and output of the transcoder.

The physical meaning of Eq. (2) can then be understood, for example, as follows. The nominator in the right-hand side of Eq. (2) is a weighted sum of conditional probabilities $P_{nm}$ over the basis set of intra modes used at the original resolution, e.g., over n=0, 1, . . . , 8. The weighting coefficient for each individual conditional probability $P_{nm}$ consists of two factors, $f_n$ and $\rho_n$. The first factor ($f_n$) reflects the fact that the more frequent intra mode n is in the initial N×N group of macroblocks, the greater influence it exerts on the resulting target-resolution intra mode. The second factor ($\rho_n$) discounts the transition probability on the overall probability of occurrence of intra mode n. The denominator in the right-hand side of Eq. (2) is the normalization factor that substantially removes the sensitivity of statistical rank $r_m$ to the specifics of different possible intra-mode configurations in the initial N×N group of macroblocks.

At step 306, statistical-rank vector $R=(r_0, r_1, r_2, r_3, r_4, r_5, r_6, r_7, r_8)$ is truncated by removing one or more (e.g., up to eight) components of the vector. The indices of the one or more remaining components of statistical-rank vector R identify the intra modes that are deemed to be the best candidates for use in the intra-mode-prediction coding of the target-resolution macroblock. The intra-modes corresponding to the removed components of statistical-rank vector R are excluded from further consideration. For example, if the truncated statistical-rank vector is given by a string $R'=(r_0, r_1, r_4, r_5)$, then only intra modes 0, 1, 4, and 5 are considered to be the candidates while intra modes 2, 3, 6, 7, and 8 are excluded from further consideration.

In one embodiment, statistical-rank vector R is truncated by removing all but a single largest component. If two or more components have the same largest value, then the component having the smaller index may be selected. Other suitable tie-breaking procedures can similarly be implemented. In another embodiment, statistical-rank vector R is truncated by removing the q smallest components, where q can be any integer from 1 to 7. In yet another embodiment, each component of statistical-rank vector R is compared to a specified threshold value and then vector R is truncated by removing the components that are smaller than the threshold value.

At step 308, a final target-resolution intra mode is selected from the candidate intra modes identified at step 306. Step 308 is not performed if a single candidate intra mode is identified at step 306. If more than one candidate intra mode is identified at step 306, then the final intra-mode selection for the target-resolution macroblock is implemented by identifying and selecting the "best intra mode" among the candidate intra modes. As already indicated above, the best intra mode has the smallest sum of absolute differences (SAD) between the intra-mode-predicted pixel values and the actual pixel values in the target-resolution macroblock. Step 308 may be implemented, e.g., using the following exemplary sub-steps: (i) calculating the SAD values for all candidate intra modes; (ii) identifying the smallest value among the calculated SAD values; and (iii) selecting the intra mode corresponding to the identified smallest SAD value. Note that step 308 differs from a typical prior-art SAD calculation, e.g., in that, at step 308, the SAD calculations are performed over a limited (truncated) set of intra modes, whereas the prior-art SAD calculation is performed over the full basis set. One skilled in the art will appreciate that, by limiting the amount of SAD calculations in this manner, method 300 advantageously enables a significant reduction in the amount of computational resources taken up by the video encoder, such as encoder 230 of FIG. 2.

Figure 4:
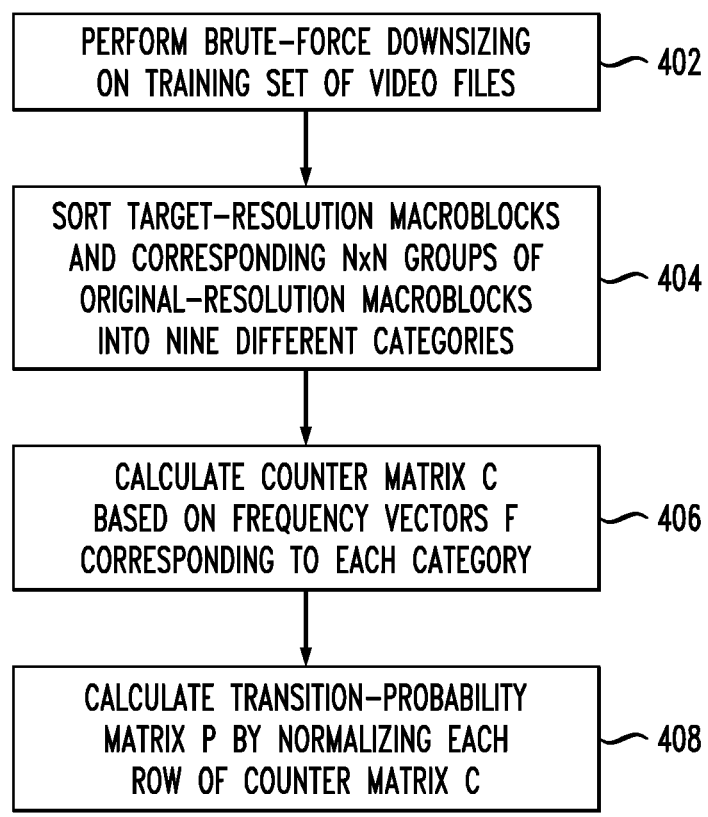
FIG. 4 shows a flowchart of a training method that can be used to determine transition-probability matrix P for the video-encoding method of FIG. 3A according to one embodiment of the invention.

FIG. 4 shows a flowchart of a training method 400 that can be used to determine transition-probability matrix P for method 300 (FIG. 3A) according to one embodiment of the invention. Method 400 can be implemented using a modified transcoder 200, in which feed-forward signal 214 is disabled, and the processor of the host device (not explicitly shown) is configured to sort and count different intra modes in video frames of bit-streams 202 and 232 (see FIG. 2). Video material for method 400 may comprise a training set of video frames, such as video files representing a "typical" movie or digital-video test sequence.

At step 402 of method 400, a so-called "brute-force" downsizing is performed. For example, to implement step 402, decoder 210 is configured to decode input video bit-stream 202 carrying a training set of video frames. Video downsizer 220 then performs planar image-size transformation, from the original resolution to the target resolution, on the resulting decoded bit-stream 212 produced by decoder 210. Encoder 230 then encodes the video bit-stream 222 generated by video downsizer 220. For the encoding process, encoder 230 is configured to select intra modes for video bit-stream 232 by performing a corresponding exhaustive full intra-mode search.

At step 404, the target-resolution macroblocks generated at step 402 and the corresponding initial N×N groups of original-resolution macroblocks are sorted into nine different categories corresponding to different intra modes of the basis set. These nine categories are numbered from zero-th to eighth. For example, if a target-resolution macroblock uses intra mode 0, then this macroblock and the corresponding initial N×N group of macroblocks are placed in the zero-th category. If a target-resolution macroblock uses intra mode 1, then this macroblock and the corresponding initial N×N group of macroblocks are placed in the first category. If a target-resolution macroblock uses intra mode 2, then this macroblock and the corresponding initial N×N group of macroblocks are placed in the second category, and so on.

At step 406, the sets of initial N×N groups of macroblocks belonging to each of the nine categories are processed as described below. For brevity, a description for the processing corresponding to only one generalized category is provided. This category is referred to as the j-th category. One skilled in the art will appreciate that the description is applicable to any $j=0, 1, \ldots, 8$.

In a first sub-step of step 406, for each N×N group of the j-th category, the frequency vector $F=(f_0, f_1, f_2, f_3, f_4, f_5, f_6, f_7, f_8)$ is calculated. The definition of frequency vector F can be found above in the description of step 302 (FIG. 3A). In a second sub-step of step 406, frequency vectors F of the whole set of the N×N groups of the j-th category are arranged to form a rectangular nine-column matrix T, wherein (i) the first column of matrix T contains the $f_0$ components of the frequency vectors, (ii) the second column of matrix T contains the $f_1$ components of the frequency vectors, (iii) the third column of matrix T contains the $f_2$ components of the frequency vectors, and so on. In a third sub-step of step 406, a nine-component string $S=(s_0, s_1, s_2, s_3, s_4, s_5, s_6, s_7, s_8)$ is calculated by summing up the matrix elements of each column of matrix T. More specifically, string element $s_0$ is the sum of vector elements $f_0$ from the first column of matrix T; string element $s_1$ is the sum of vector elements $f_1$ from the second column of matrix T; string element $s_2$ is the sum of vector elements $f_2$ from the third column of matrix T, and so on. In a fourth sub-step of step 406, the j-th column of a counter matrix $C=[C_{ij}]$ is calculated using Eq. (6):

$$C_{ij}=s_i \qquad (6)$$

where $i=0, 1, \ldots, 8$. According to Eq. (6), each column of counter matrix C is the corresponding transposed string S.

At step 408, transition-probability matrix P is calculated by normalizing each row of counter matrix C using Eq. (7):

$$P_{ij} = \frac{C_{ij}}{\sum_{j=0}^{8} C_{ij}} \qquad (7)$$

While this invention has been described with reference to illustrative embodiments, this description is not intended to be construed in a limiting sense.

Although various embodiments of the invention have been described above in reference to a basis set having the nine intra modes shown in FIG. 1 and macroblocks having a size of 4×4 pixels, the invention is not so limited. More specifically, relatively straightforward modifications to the described embodiments can be made to enable them to work with a different number of intra modes in the basis set and/or a different macroblock size. For example, methods 300 and 400 can be modified to apply to macroblocks having a size of 16×16 pixels and the corresponding four intra modes defined in the H.264/AVC Standard. Other intra-mode-number/macroblock-size combinations are also possible.

Furthermore, embodiments in which intra-mode-prediction coding at the original resolution and intra-mode-prediction coding at the target resolution use different basis sets of intra modes and/or different video-compression standards are also envisioned. The intra-mode basis sets used at the original resolution and the target resolution may differ, e.g., in the number and/or type of the intra modes in the sets. For example, intra-mode-prediction coding at the original resolution and intra-mode-prediction coding at the target resolution may employ the basis sets having $M_1$ and $M_2$ intra modes, respectively. In this case, the intra-mode transition-probability matrix is no longer a square matrix, but is an $M_1 \times M_2$ rectangular matrix. One of ordinary skill in the art will understand that training method 400 can be modified in a relatively straightforward manner to produce such a matrix.

The basis set of intra modes used at the original resolution may be referred to as an "input" basis set of intra modes. The basis set of intra modes used at the target resolution may be referred to as an "output" basis set of intra modes.

Although various embodiments of the invention have been described in reference to intra-mode transition-probability matrix P, the use of other representations of the intra-mode transcoding statistics are also possible.

Although various quantities used in methods 300 and 400 have been described as being normalized to 1, the use of other normalization constants is similarly possible.

Various embodiments of the invention can be used for encoding not only I-frames, but also certain P- and B-frames.

Various modifications of the described embodiments, as well as other embodiments of the invention, which are apparent to persons skilled in the art to which the invention pertains are deemed to lie within the principle and scope of the invention as expressed in the following claims.

As used herein, the term "macroblock" refers to an image component used in video compression. A macroblock comprises two or more pixels. More specifically, the particular size of a macroblock depends on the codec and is usually a multiple of four pixels. The most frequently used macroblock sizes are 4×4, 8×8, and 16×16 pixels. A macroblock may also have a rectangular shape, with the height being 4, 8, 12, or 16 pixels and the width being 4, 8, 12, or 16 pixels, wherein the height is different from the width.

Color information may be encoded at a lower resolution than the luminance information. For example, the color information of an 8×8 block in a 4:1:1 color space is encoded using a YCbCr format, wherein the luminance is encoded in an 8×8 pixel format while the difference-red and difference-blue information is encoded in a 2×2 pixel format.

As known in the art, the term "spatial resolution" generally refers to the amount of detail that an image holds. Higher spatial resolution typically corresponds to more image detail. Image resolution can be measured in various ways. For example, image resolution can be used to quantify how close two lines can be to each other to still be perceived as separate lines in the image. Resolution units can be tied to physical sizes (e.g., lines per inch), to the overall size of a picture (e.g., lines or pixels per height/width of the picture), or to angular subtenant. Line pairs are often used instead of lines, with a line pair comprising a dark line and an adjacent light line. In television, a resolution of ten lines per millimeter means five dark lines alternating with five light lines per millimeter. In digital imaging, resolution is usually tied to the pixel count in an image. More specifically, it is often said that an image has a vertical resolution of Y pixels and a horizontal resolution of X pixels, e.g., 640×480 pixels. Another popular convention is to cite resolution as the total number of pixels in the image, which is calculated by multiplying the number of pixel columns by the number of pixel rows. Other conventions include describing resolution in pixels per length unit or pixels per area unit, such as pixels per inch or pixels per square inch.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

A person of ordinary skill in the art would readily recognize that steps of various above-described methods can be performed by programmed computers/processors. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media, such as magnetic disks or tapes, hard drives, or optically readable digital data storage media.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method of resizing digital video, the method comprising:
   converting a group of first macroblocks in a first video frame having a first spatial resolution into a second macroblock in a corresponding second video frame having a second spatial resolution smaller than the first spatial resolution;
   ranking intra modes in an output basis set of intra modes based on intra modes used in the group of first macroblocks and on intra-mode transcoding statistics gathered from downsizing a training set of video frames from the first spatial resolution to the second spatial resolution;
   identifying a set of one or more candidate intra modes for the second macroblock based on the ranking, wherein the identified set is smaller than the output basis set;
   selecting an intra mode for intra-mode-prediction coding of the second macroblock from the identified set;
   applying the intra-mode-prediction coding to the second macroblock using the output basis set; and
   determining a transition-probability matrix from said downsizing the training set of video frames, wherein the transition-probability matrix is a representation of the intra-mode transcoding statistics for use in the step of ranking.

2. The method of claim 1, wherein:
   the group of first macroblocks has $N^2$ macroblocks arranged in an N×N array, where N is an integer greater than one;
   each of the first macroblocks and the second macroblock has sixteen respective pixels arranged in a 4×4 array; and
   the output basis set has nine intra modes and the intra-mode transcoding statistics are represented by a 9×9 transition-probability matrix.

3. The method of claim 1, wherein:
   the intra-mode transcoding statistics are represented by a transition-probability matrix;
   each row of the transition-probability matrix corresponds to one respective intra mode from an input basis set of intra modes used for intra-mode-prediction coding of the group of first macroblocks at the first spatial resolution;
   each column of the transition-probability matrix corresponds to one respective intra mode from the output basis set; and
   the sum of matrix elements in a row is equal to a constant, said constant being the same for all rows of the transition-probability matrix.

4. The method of claim 3, wherein the output basis set is different from the input basis set.

5. The method of claim 1, wherein:
   a specified set of intra modes is used both as an input basis set and the output basis set; and the step of ranking comprises:
   for each intra mode of the specified basis set, determining a respective frequency of occurrence in the intra-mode configuration of the group of first macroblocks; and
   determining the ranking of the intra modes based on the determined frequencies.

6. The method of claim 5, wherein the ranking of the intra modes takes into account an unequal probability distribution, in video content, of the intra modes from the specified basis set.

7. The method of claim 1, wherein the identified set consists of a single intra mode having a highest rank.

8. The method of claim 1, wherein the step of identifying comprises removing from consideration a specified number of intra modes having lowest ranks.

9. The method of claim 1, wherein the step of identifying comprises:
   comparing ranks of the intra modes with a threshold value; and
   removing from consideration the intra modes whose ranks are lower than the threshold value.

10. The method of claim 1, wherein the step of selecting comprises:
    for each intra mode from the identified set, calculating a respective sum of absolute differences between intra-mode-predicted pixel values and actual pixel values in the second macroblock; and
    selecting an intra mode having a smallest sum of absolute differences.

11. The method of claim 1, wherein the method is implemented in a video transcoder.

12. The method of claim 1, further comprising at least partially decoding an encoded video bit-stream to produce the first video frame, wherein the encoded video bit-stream has been generated using intra-mode-prediction coding that employs a basis set of intra modes that differs from the output basis set in at least one of (i) number of intra modes and (ii) type of at least one intra mode.

13. The method of claim 1, wherein the step of determining comprises:
    decoding a first encoded video bit-stream carrying the training set of video frames at the first spatial resolution to produce a first decoded video bit-stream;

performing planar image-size transformation, from the first spatial resolution to the second spatial resolution, on the first decoded video bit-stream to produce a second decoded video bit stream;

encoding the second decoded video bit-stream using a full intra-mode search over the output basis set to produce a second encoded video bit-stream carrying the training set of video files at the second spatial resolution; and analyzing intra-mode transcoding statistics for the first and second encoded video bit-streams to compile the transition-probability matrix.

14. The method of claim 13, wherein the step of analyzing comprises:

sorting macroblocks of the second encoded video bit-stream and corresponding groups of macroblocks of the first encoded video bit-stream into a plurality of different categories corresponding to different respective intra modes of the output basis set;

for each category, processing the groups of macroblocks belonging to the category to determine a respective column of a counter matrix; and normalizing each row of the counter matrix to calculate the transition-probability matrix, wherein, for each category, the step of processing comprises:

for each group of macroblocks in the category, calculating a respective intra-mode frequency vector;

stacking the calculated intra-mode frequency vectors to form a rectangular matrix, wherein different columns of the rectangular matrix have different respective components of the intra-mode frequency vectors;

calculating a string of values by summing up matrix elements in the respective columns of the rectangular matrix; and transposing the calculated string to produce a respective column of the counter matrix.

15. The method of claim 1, wherein the training set of video frames does not include the first video frame.

16. A video transcoder, comprising:

a decoder adapted to decode an encoded video bit-stream to produce a first video frame having a first spatial resolution;

a downsizer adapted to convert the first video frame into a corresponding second video frame having a second spatial resolution smaller than the first spatial resolution, wherein a group of first macroblocks from the first video frame is converted into a second macroblock in the second video frame; and an encoder adapted to apply intra-mode-prediction coding to the second macroblock using an output basis set of intra modes, wherein:

the intra modes in the output basis set are ranked based on intra-mode transcoding statistics and intra modes used in the group of first macroblocks;

a set of one or more candidate intra modes for the second macroblock is identified based on the ranking, wherein the identified set is smaller than the output basis set; and an intra mode for the intra-mode-prediction coding of the second macroblock is selected from the identified set, wherein:

the intra-mode transcoding statistics are represented by a transition-probability matrix;

each row of the transition-probability matrix corresponds to one respective intra mode from an input basis set of intra modes used for intra-mode-prediction coding of the group of first macroblocks at the first spatial resolution;

each column of the transition-probability matrix corresponds to one respective intra mode from the output basis set; and the sum of matrix elements in a row is equal to a constant, said constant being the same for all rows of the transition-probability matrix.

17. The video transcoder of claim 16, wherein the encoder is adapted to:

for each candidate intra mode from the identified set, calculate a respective sum of absolute differences between intra-mode-predicted pixel values and actual pixel values in the second macroblock; and select an intra mode having a smallest sum of absolute differences for the intra-mode-prediction coding.

18. The video transcoder of claim 16, wherein:

the decoder is adapted to decode the encoded video bit-stream using a first video-compression standard; and the encoder is adapted to encode the second video frame using a second video-compression standard different from the first video-compression standard, with the applied intra-mode-prediction coding being part of the encoding.

19. A video transcoder, comprising:

means for converting a group of first macroblocks in a first video frame having a first spatial resolution into a second macroblock in a corresponding second video frame having a second spatial resolution smaller than the first spatial resolution;

means for ranking intra modes in an output basis set of intra modes based on intra modes used in the group of first macroblocks and on intra-mode transcoding statistics gathered from downsizing a training set of video frames from the first spatial resolution to the second spatial resolution, wherein said means for ranking comprises a transition-probability matrix determined from said downsizing the training set of video frames, said transition-probability matrix being a representation of the intra-mode transcoding statistics;

means for identifying a set of one or more candidate intra modes for the second macroblock based on the ranking, wherein the identified set is smaller than the output basis set;

means for selecting an intra mode for intra-mode-prediction coding of the second macroblock from the identified set; and means for applying the intra-mode-prediction coding to the second macroblock using the output basis set.

20. A method of resizing digital video, the method comprising:

converting a group of first macroblocks in a first video frame having a first spatial resolution into a second macroblock in a corresponding second video frame having a second spatial resolution smaller than the first spatial resolution;

ranking intra modes in an output basis set of intra modes based on intra modes used in the group of first macroblocks and on intra-mode transcoding statistics;

identifying a set of one or more candidate intra modes for the second macroblock based on the ranking, wherein the identified set is smaller than the output basis set;

selecting an intra mode for intra-mode-prediction coding of the second macroblock from the identified set; and applying the intra-mode-prediction coding to the second macroblock using the output basis set, wherein:

the intra-mode transcoding statistics are represented by a transition-probability matrix;

each row of the transition-probability matrix corresponds to one respective intra mode from an input basis set of intra modes used for intra-mode-prediction coding of the group of first macroblocks at the first spatial resolution;

each column of the transition-probability matrix corresponds to one respective intra mode from the output basis set; and the sum of matrix elements in a row is equal to a constant, said constant being the same for all rows of the transition-probability matrix.

21. The method of claim 20, wherein the output basis set is different from the input basis set.

\* \* \* \* \*